INVENTOR
JAMES CHRISTOFFERSON
BY Francis J. Thornton
ATTORNEY

United States Patent Office 3,424,929
Patented Jan. 28, 1969

1

3,424,929
EQUIPOTENTIAL RINGS FOR ELECTROSTATIC MACHINES
James Christofferson, West Newbury, Mass., assignor to High Voltage Engineering Corporation, Burlington, Mass., a corporation of Massachusetts
Filed Dec. 23, 1966, Ser. No. 604,288
U.S. Cl. 310—5    4 Claims
Int. Cl. H02n 1/12

This invention is directed towards equipotential rings, for use in high energy electrostatic equipment, which can be split for installation and mechanically rejoined without creating an electrical stress point in the machine.

One particular model of the well known particle accelerator, sold by High Voltage Engineering Corporation under the trademark Van de Graaff, is designed for unprecedented D.C. beam energies. This model known as the M.P. can provide a 20 microampere beam at 10 million volts. This unit requires a generator tank about 81 feet long with an internal diameter, at its midsection opposite the high voltage terminal, of 18 feet. Since it is necessary that an insulating gas under pressure, be provided in the tank and since such gas is expensive considerable savings in both gas and in tank material can be realized if the diameter of the tank is reduced at those points, in the tank, which are not at high voltage. Thus each end of the tank can, without electrical effects be reduced to a diameter of 11 feet.

However, because such tanks or pressure vessels must be constructed with spherical or elliptical end then in accordance with the code regulations, for unfired pressure vessels, of the American Society of Mechanical Engineers, access parts in the tank cannot exceed one-half of the smallest diameter of the tank end. Thus the largest permitted opening that could be provided in the described tank was five and one-half feet.

This created a serious problem since the internal electrical components used in such accelerators require surrounding equipotential rings to establish a controlled potential gradient along the acceleration tubes. In order to obtain the desired voltage levels it was necessary that, in this machine, the rings have diameters of about 74 inches. Such rings must present a continuous electrical surface to the tank.

Prior to the present invention these rings were made of rolled tubing whose ends were welded together. This prior art fabrication technique was long followed because, until the present invention was conceived and reduced to practice, it was believed that any slight discontinuities in the ring would create electrical stress points. The use of such solid ring thus restricted the reduction in diameter of the tank ends to that which could accept access openings large enough to receive the welded ring of the prior art.

However, the present inventor has found it possible to split these rings such that they can be inserted through openings smaller than their diameter and rejoined mechanically without creating electrical stress points.

Broadly speaking the invention resides in the splitting of the ring such that it can enter an opening smaller than its closed diameter and in the novel supports for closing the ring such that electrical stress points are not created when the ring is positioned within the tank and joined.

The use of the split rings and supports of the present invention result in further advantages in that rings may be readily interchanged or removed for repair purposes.

These and other features of the invention will become more apparent from the accompanying description of the invention.

The following description of the invention and its application is to be considered in conjunction with the accompanying drawing wherein.

Figure 1:
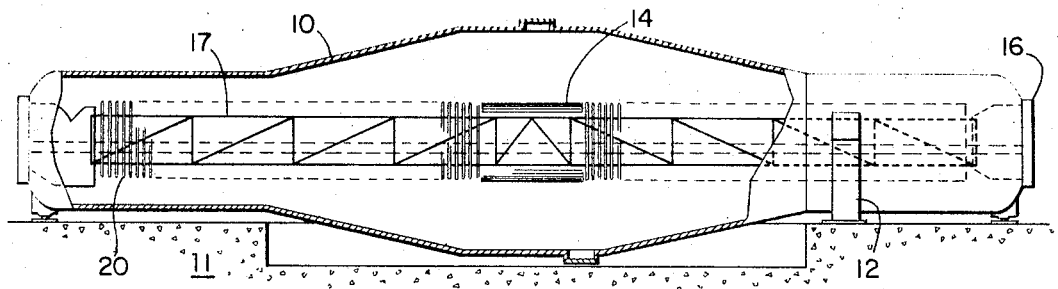
FIGURE 1 shows in schematic cross section an accelerator using the invention.

Referring first to FIGURE 1 it is seen that the outer shell of an accelerator utilizing the present invention comprises a pressure vessel or tank 10, approximately 81 feet long, which is supported off the floor 11 by a plurality of legs 12. The diameter of vessel 10 varies from 18 feet at its center, where it encloses the high voltage terminal 14, to 11 feet at its ends wherein there is provided an access port 16. The total volume of this tank is about 11,250 cubic feet and its empty weight is about 285,000 pounds. Inside this tank the high voltage terminal is supported by a 70 foot long insulating column 17 mounted horizontally under compression. This column also supports the necessary associated equipment (not shown) such as the charging belt, drive motor, motor pulley system, acceleration tubes, etc.

This support column is comprised of eight foot long rectangular, insulative beams arranged in a hollow square truss configuration. These beams are made insulative by fabricating the central six foot section from laminated insulating glass blocks interspaced with steel planes. When such beams are assembled in this truss configuration they provide not only the strength and rigidity necessary to support the high voltage elements but also provide the insulative qualities needed to insulate the high voltage portions of the equipment from the tank ends.

Because this column is rectangular it presents to the surrounding tank walls electrical stress points unless it is surrounded by equipotential rings 20 which are fitted with voltage-dividing resistors (not shown). This arrangement establishes, along the enclosed column, a controlled potential gradient and forms an electrically smooth envelope around the column.

Figure 2:
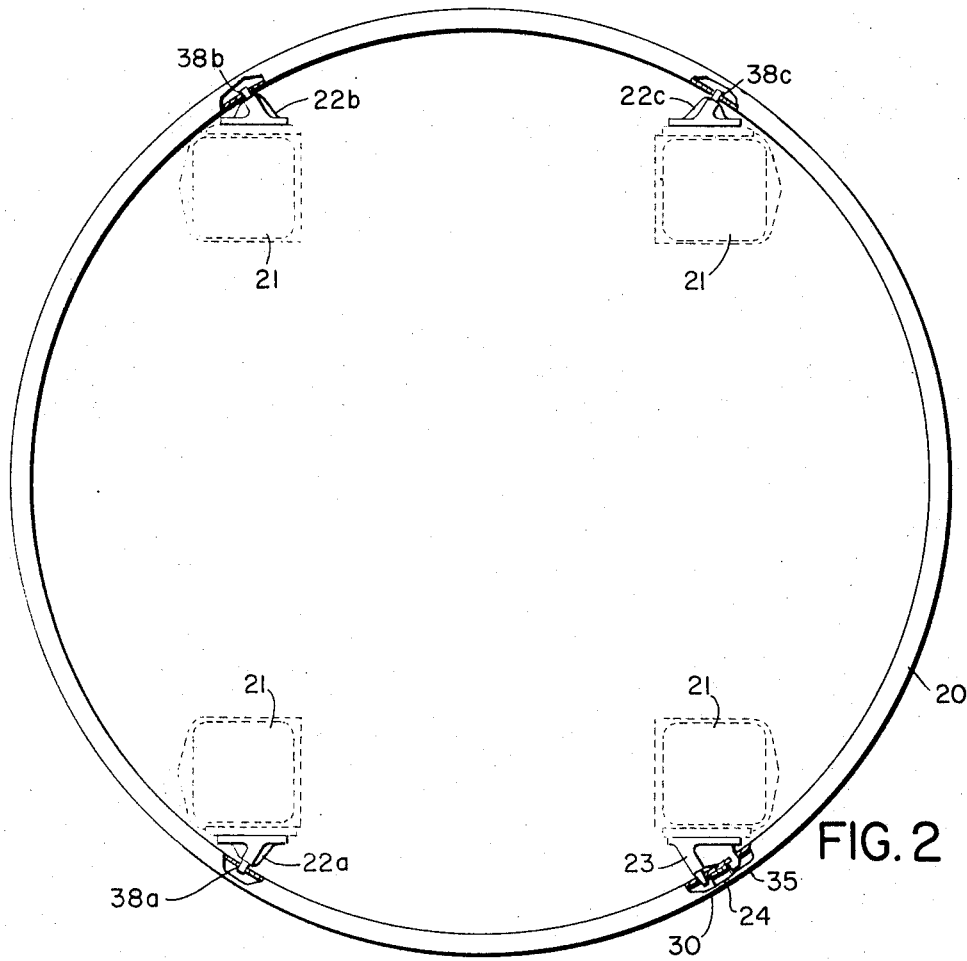
FIGURE 2 illustrates one equipotential plane of the accelerator of FIGURE 1 when the present invention is employed.
Figure 3:
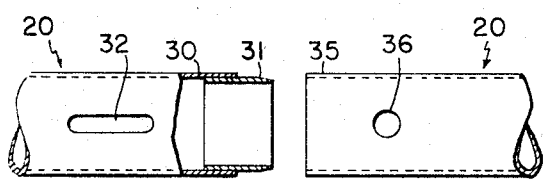
FIGURE 3 shows in detail the joint required when the ring is split in accordance with the invention.

The rings employed are all identical and evenly spaced along the column. Each ring is fabricated by rolling a stainless steel tubing to form a hoop. In the subject invention before the ring is installed on the column and closed it is in the form of a hoop having a gap therein. In the described case the closed rings have a 74" diameter and the gap in the open condition is five inches. The details of such a hoop are shown in FIGURES 2 and 3. In FIGURE 2 the hoop is shown closed and assembled to the column beams 21 by suitable support brackets 22 and 23. As shown four brackets are used, three of which are identical (brackets 22) and one used only to support the hoop in a fixed position with respect to the beams 21. The remaining bracket 23 is used not only to support the hook but also to join the ends of the hook and spans the juncture 24 where the hoop ends mate.

Because this juncture 24 must be such so as not to create an electrical stress point in the ring its formation and configuration is of some importance and is shown in detail in FIGURE 3.

In this figure the tube ends are shown separated. One end 30 is fitted with a short tightly fitting sleeve or tubing insert 31. In the particular model under discussion the hoop was formed from fully annealed stainless steel tubing 1½ inches in diameter. The insert 31 is also composed of stainless steel and is a two inch length of 1.425 inch diameter tubing. This insert is telescoped into end 30 and welded therein. If desired, for vacuum purposes, a groove may be provided circumferentially around the insert at the middle thereof.

Figure 4:
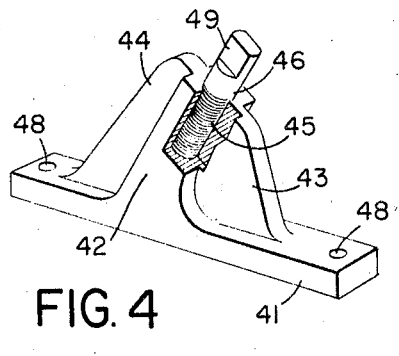
FIGURE 4 shows a ring support bracket.

A 1.25 inch long slot 32 is provided in the hoop close to end 30. Specifically this slot is positioned such that it begins 1.25 inches away from end 30. The other end 35 of the hoop is made to mate with that portion of insert 31 protruding from end 30. End 35 is further provided with a .375 inch diameter hole 36 which is located 1.19 inches from the end 35. Both hole 36 and slot 32 must be in line with one another and located on the interior wall of the hoop in the plane of the hoop. Also in this same plane and on the same wall are located three other slots 38a, 38b and 38c each of which are identical to slot 32. These slots are located 63°, 180° and 243° respectively from the end 30. The brackets used to engage the slots 38a, 38 and 38c are identical and shown in FIGURE 4.

These brackets are die cast from aluminum and comprise a base 41 which supports at a 58° 30" angle a barrel 42. Buttresses 43 and 44 extending between the barrel and base add strength and rigidity to the unit. The barrel 42 is provided with a hole 45 drilled to a depth of 1.5 inches and tapped to accommodate a threaded stud 46. This stud is made 2 inches long and is threaded for about one-half of its length such that it will fit into tapped hole 45. The stud is further provided with a tongue 49 which will mate with the slot provided in the hoop. In order to secure the bracket to the column, holes 48 are provided in the elongated base at each end thereof.

Conceivably stud 46 could be spring loaded and unthreaded. However, the use of such spring loaded brackets would not be preferred since use of the described threaded devices can be adjusted readily to compensate for variations in the hoops.

Figure 5:
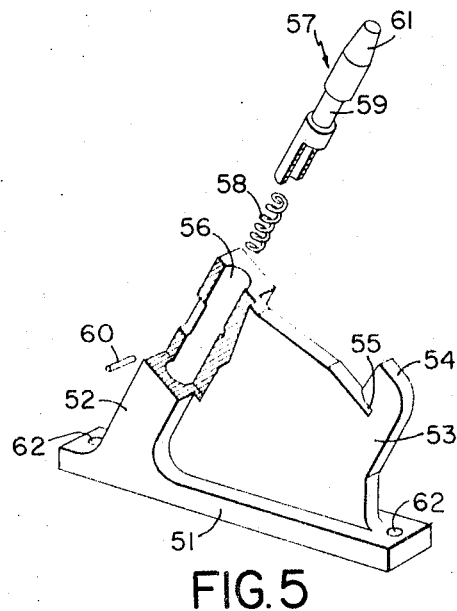
FIGURE 5 shows a ring support bracket used to rejoin the ring at the split.

The bracket used to span joint 24 is shown in FIGURE 5. This bracket is also of die cast aluminum and comprises a base 51 supporting close to one end thereof a barrel 52 positioned at a 58° 30" angle with respect to the base. The barrel 52 is supported by a flange 53 which extends from barrel 52 almost the entire length of the base. This flange 53 does not slope off gradually from the barrel to the base but rather maintains over its entire length a height substantially equal to the height of the barrel taken perpendicular to the base. This flange is further provided, at the end opposite the barrel, with a hook like extension 54 having a slot 55 therein such that it can engage and interlock with slot 32 in the end 30. The barrel 52 has a hole 56 drilled therein which will accommodate a tapered locating pin 57. By spring loading this pin with spring 58 it will exert a positive force against the perimeter of hole 36 when the tube end 35 is slipped over insert 31 such that the hoop is closed to form ring 20. Pin 57 is also provided with a circumferential groove 59 which engages a shaft 60 passing through barrel 52. This shaft thus prevents pin 52 from falling out of the barrel yet permits the pin to move a specified distance in the barrel sufficient to permit the head 61 of pin 57 to engage hole 36.

In use the hoop is slipped over the column structure, positioned on brackets 22a, 22b, 22c and end 30 slipped over and interlocked with extension 54 of bracket 23. The free end 35 is then slipped over insert 31 and loading pin 57 permitted to engage hole 36. To remove the hoop the pin is retracted from hole 36 and the hoop disengaged from the brackets. Because this hoop is readily and easily removed repairs can be made to a section without the necessity of removing or changing the bracket position.

Furthermore because of the springiness in the hoop a gap about 5 inches is obtained when the hoop is opened. This permits the opened hoop to be readily slipped over adjacent hoops without disturbing adjacent hoops. This feature further perimts the ready interchange of hoops or hoop removal for maintenance purposes.

Having now described the invention it is to be understood that further modifications can be readily made by those skilled in the art and that the invention is to be limited only by the appended claims.

I claim:
1. A high energy electrostatic machine having an insulative equipment supporting column surrounded by an equipotential shield made up of a plurality of equipotential rings, wherein the improvement comprises an equipotential ring having an electrically conductive surface, a first end and a second end, and a radius such that said first end can be aligned with said second end said first end being provided with means for engaging a bracket and mechanically interlocking therewith, said first end being further provided with means for locating said second end in abutting relationship with said first end, and said second end being provided with means for engaging said bracket when said second end is positioned on said locating means whereby said ring is mechanically closed to form a continuously conductive ring around said column.

2. The machine of claim 1 wherein said locating means comprises a projection on one of said ends adapted to mate with and telescope within a recess on said other end.

3. The machine of claim 1 wherein said ring comprises a hollow tube of metal, said locating means comprises an insert, having a diameter smaller than the internal diameter of said tube, fitted in one of said ends and projecting therefrom so that it will mate with the other of said ends, said engaging means on said first end comprising a slot and said engaging means on said second end comprising a hole.

4. The machine of claim 1 wherein said bracket comprises a base, a barrel on one end of said base at an angle thereto, a spring loaded locating pin in said body, means for permitting a predetermined amount of movement of said pin in said barrel, a flange extending along said base, said flange having substantially the same perpendicular height as said barrel, and a hook on the end thereof opposite to said barrel, said hook adapted to interlock with said engaging means on said first end, said pin adapted to engage said engaging means on said second end, said engaging means on said first end being a slot on the interior wall of said ring and said engaging means on said second end being a hole on the interior wall of said ring.

References Cited

UNITED STATES PATENTS

| | | | |
|---|---|---|---|
| 2,578,908 | 12/1951 | Turner | 310—6 X |
| 2,810,077 | 10/1957 | Gale | 250—93 |
| 2,847,586 | 8/1958 | Stiff | 310—5 |
| 2,858,460 | 10/1958 | Wilson | 310—5 |
| 2,971,145 | 2/1961 | Enge | 321—8 |

MILTON O. HIRSHFIELD, *Primary Examiner.*

D. F. DUGGAN, *Assistant Examiner.*

U.S. Cl. X.R.

310—6